UNITED STATES PATENT OFFICE.

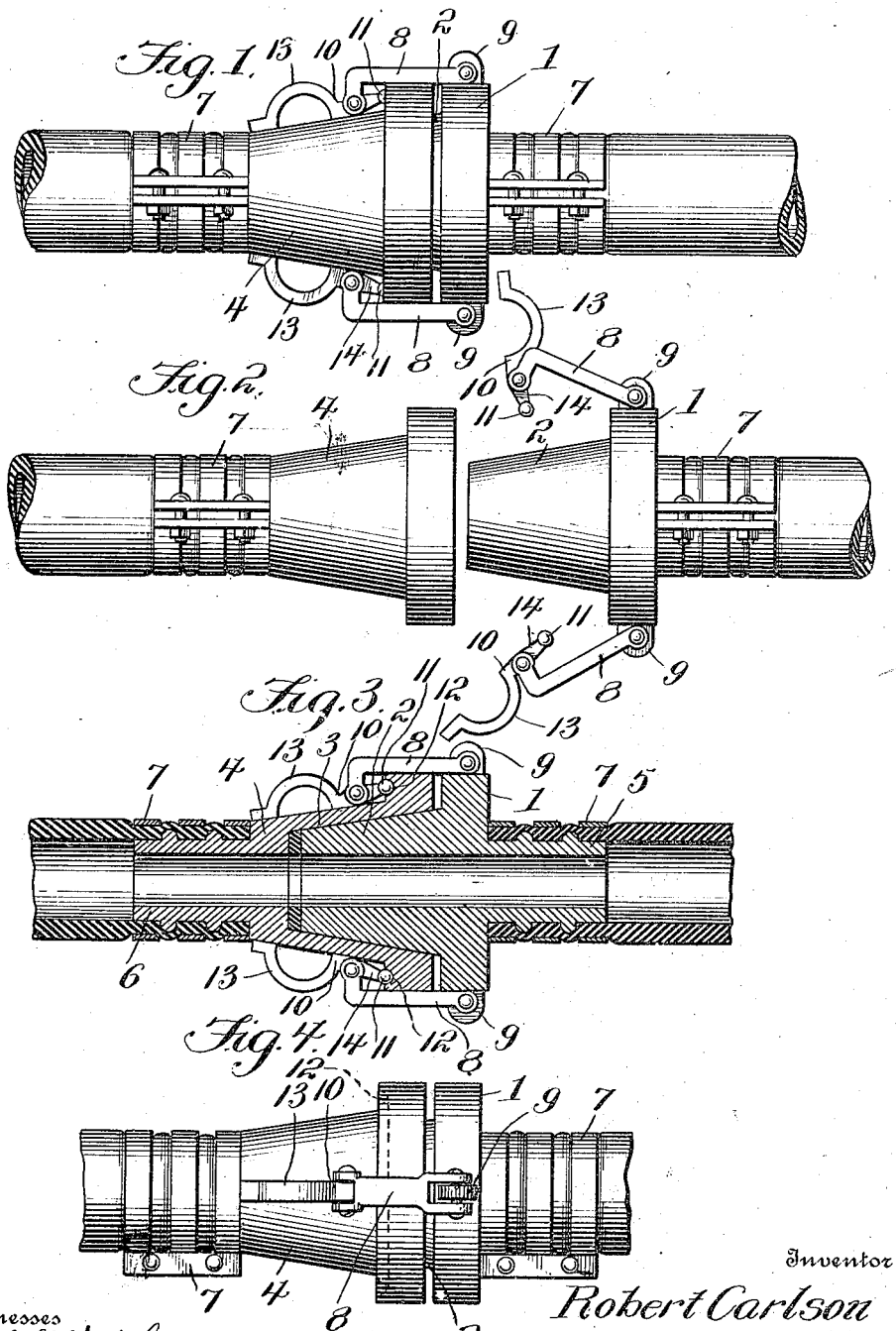

ROBERT CARLSON, OF GREENWICH, CONNECTICUT.

HOSE-COUPLING.

1,178,839.

Specification of Letters Patent.  Patented Apr. 11, 1916.

Application filed June 12, 1915. Serial No. 33,785.

*To all whom it may concern:*

Be it known that I, ROBERT CARLSON, a citizen of the United States, residing at Greenwich, in the county of Fairfield and State of Connecticut, have invented new and useful Improvements in Hose-Couplings, of which the following is a specification.

This invention relates to a hose clamp and more particularly to that class wherein a male and female member are forced into tight engagement with each other through the action of a series of links.

An object of the invention is to arrange the link mechanism so that the same can be made of light material and at the same time held against being distorted by coming into contact with foreign bodies.

The invention consists in the features of construction, combination and arrangement of parts, hereinafter fully described and claimed, reference being had to the accompanying drawings, in which:

Figure 1 is a side elevation of the device in assembled form. Fig. 2 is a similar view in a disassembled form. Fig. 3 is a longitudinal section. Fig. 4 is a top plan view.

Referring to the drawings, the numeral 1 designates the male member having its tapering portion 2 coöperating with the tapered passage 3 of the female member 4. Each of the members is provided with extensions 5 and 6 provided with circumferentially extending ribs whereby the hose may be effectively connected to the members through the action of the clamps 7. The link mechanism for clamping the two members together comprises substantially L-shaped links 8 each of which has one extremity bifurcated and straddling the apertured ears 9. A pin passes through the limbs formed by the bifurcation and through the aperture of the ear so as to give a pivotal connection between the male member 1 and the link. Pivotally connected to the other extremity of each of the links 8 is a link or lever 10 having one extremity formed into a ball 11 that seats within an annular groove 12 formed within the female member. The lever 10 when in clamping position tightly contacts with the side of the female member, while the same is true with each of the links 8 with relation to the sides of both the female and male members.

For readily operating the lever 10, I bend the intermediate portion of each of the levers into a semicircular finger grip 13, the portion of each of the levers between the pivot point and the ball 11 as shown at 14 extends at an angle to the major portion of the lever so that the pressure exerted upon the ball will be in direct alinement with the pivot point to one side of a horizontal line.

From the foregoing description, it will be seen that I have provided a simple structure for effectively connecting the hose sections together and a further detailed description of the invention is thought to be unnecessary.

Having described the invention, what is claimed is:

In combination a male member provided with a circumferential flange, a female member coöperating therewith and provided with a circumferential flange, L-shaped links, each having one extremity pivotally connected to the flange of the male member and a short limb adapted to lie parallel to the flange of the female member with its free end resting on the female member when in an operative position, and a lever pivoted to the short limb of each of said links and adapted to lie in flat engagement with the surface of said female member with one end against the flange of said female member.

In testimony whereof I affix my signature in presence of two witnesses.

ROBERT CARLSON.

Witnesses:
ALLEN A. KNAPP,
ARTHUR JENSEN.